Patented May 3, 1938

2,115,857

UNITED STATES PATENT OFFICE 2,115,857

METHOD OF PRODUCING POTASSIUM NITRATE FROM POTASSIUM SULPHATE AND MIXTURES CONTAINING THE SAME

Oscar Kaselitz, Berlin, Germany

No Drawing. Application December 29, 1932, Serial No. 649,330. In Germany January 28, 1932

8 Claims. (Cl. 23—102)

My invention refers to the production of potassium nitrate and more particularly to processes in which potassium sulphate or mixtures containing same are acted upon with nitric acid. It is an object of my invention to render such processes simpler and more efficient than those heretofore known.

It has already been proposed to act on potassium sulphate with nitric acid in, or exceeding the, molecular proportions of $1K_2SO_4:2HNO_3$, but experience has shown that the product thus obtained largely or even exclusively consists of the double salt $KHSO_4.KNO_3$. Statements to the effect that satisfactory yields are obtained if this condition is observed, have turned out to be erroneous.

According to my invention I also act on potassium sulphate with nitric acid, but I obtain maximum yields in substantially pure potassium nitrate by so regulating the concentration of the reaction mixture in regard to the temperature to which it is allowed to cool down during the crystallization of the potassium nitrate, that substantially all the sulphate ions remain in a dissolved state, but in the form of a solution substantially saturated with the double salt $KHSO_4.KNO_3$ mentioned above. The potassium nitrate thus obtained crystallizes substantially in pure form and after removal of the mother liquor adhering to the crystals by slight washing of the salt can be used for many purposes. The acidic mother liquor, which contains further quantities of potassium and nitrogen, can be utilized for the production of fertilizers, for instance by neutralizing it with ammonia, and evaporating.

In carrying out my invention I use as starting material pure or technically pure potassium sulphate, but I may also use mixtures of potassium sulphate with other soluble sulphates, such as those of sodium or magnesium. I can also use the corresponding double salts such as schoenite, glaserite and the like.

The concentration of the nitric acid used may vary within wide limits without materially influencing the process and the yield in potassium nitrate obtained. The lowest temperature to which the solution may be cooled down, may be determined by general working conditions. The composition of the solution must then be adjusted to this temperature. The lower it can be chosen, other conditions being equal, the better is the yield of potassium nitrate.

As will be readily understood by those skilled in the art, the maximum yield is obtained if the reaction mixture is cooled down to about that temperature at which the solution becomes saturated with regard to the double salt $KHSO_4.KNO_3$, so that on further reducing this temperature the potassium nitrate already crystallized out would become contaminated with such double salt. On the other hand this very limit of temperature need not necessarily be reached, since similar, although somewhat smaller yields are obtained at slightly higher temperatures.

The mother liquor obtained in accordance with my invention can advantageously be used for the conversion of phosphatic minerals into fertilizers containing phosphorus, such as superphosphate, the plant nutrients contained in the mother liquor being thus utilized as well as its acidity.

Example 1

65.34 kgs. potassium sulphate are mixed with 142.2 kgs. nitric acid of 29.7% by weight $HNO_3$. In order to expedite the dissolution the mixture can be slightly heated. On cooling to 25° C., 32.4 kgs. of very pure potassium nitrate crystallize out. The crystals are separated from the bulk of the mother liquor and washed with water or with a dilute solution of potassium carbonate to remove the residual mother liquor adhering to the crystals. The mother liquor thus obtained contains per 100 grs. water

|  | Grams |
|---|---|
| $K_2SO_4$ | 37.3 |
| $HNO_3$ | 21.8 |
| $H_2SO_4$ | 15.1 |

By neutralizing it with ammonia and evaporating, a mixed fertilizer is obtained which contains potassium and nitrogen.

Example 2

186.2 kgs. nitric acid of 46.3% by weight $HNO_3$ are mixed under stirring with 47.6 kgs. potassium sulphate. The reaction mixture is cooled down to 0° C., whereby 36.3 kgs. of a very pure potassium nitrate are made to crystallize out. The crystals are separated from the bulk of the mother liquor and washed as described with reference to Example 1. The mother liquor contains per 100 grs. water

|  | Grams |
|---|---|
| $K_2SO_4$ | 16.0 |
| $HNO_3$ | 63.5 |
| $H_2SO_4$ | 17.3 |

It can be used in the production of superphosphate instead of sulphuric acid, the product thus obtained containing phosphorus, potassium and nitrogen in satisfactory proportions.

Example 3

86.3 kgs. of the double salt schoenite having the formula $K_2SO_4 \cdot MgSO_4 \cdot 6H_2O$ are dissolved in 111 kgs. nitric acid of 30.8% by weight $HNO_3$. The mixture is heated to completely dissolve the salt and is then cooled down to 25° C., whereby 15.5 kgs. of a very pure potassium nitrate are made to crystallize out. The crystals are washed as described with reference to Example 1. The mother liquor contains per 100 grs. water

| | Grams |
|---|---|
| $MgSO_4$ | 25.8 |
| $K_2SO_4$ | 24.0 |
| $HNO_3$ | 24.5 |
| $H_2SO_4$ | 7.5 | and can be utilized as described with reference to Example 1.

Example 4

130.0 kgs. of the mineral glaserite (potassium-sodium sulphate) containing potassium and sodium in a ratio of 2.57:1 are dissolved in 216.6 kgs. nitric acid having a density of 22.9° Bé. The dissolution is expedited by stirring and the solution is then cooled down to 25° C., whereby 21.7 kgs. pure potassium nitrate are made to crystallize out. The crystals are washed with a dilute solution of potassium carbonate. The mother liquor which contains per 100 grs. water

| | Grams |
|---|---|
| $K_2SO_4$ | 53.4 |
| $HNO_3$ | 16.9 |
| $H_2SO_4$ | 21.4 |
| $NaNO_3$ | 25.0 | can be utilized as described with reference to Example 1.

Example 5

75.3 kgs. of a mixture consisting of 64.9 kgs. potassium sulphate and 10.4 kgs. sodium sulphate are dissolved in 144.4 kgs. of a pure nitric acid containing 365 grs. $HNO_3$ per litre. On cooling to 25° C., 23.6 kgs. of a highly pure potassium nitrate are made to crystallize out. The mother liquor contains per 100 grs. water

| | Grams |
|---|---|
| $K_2SO_4$ | 44.5 |
| $HNO_3$ | 20.0 |
| $H_2SO_4$ | 18.6 |
| $NaNO_3$ | 12.5 |

Various changes may be made in the details disclosed in the foregoing specification without departing from the invention or sacrificing the advantages thereof.

I claim:—

1. The method of producing potassium nitrate from materials containing potassium sulphate and from nitric acid, comprising acting on such material with nitric acid and cooling the solution thus obtained, for the crystallization of pure potassium nitrate, down to but not below the temperature at which the mother liquor becomes almost saturated with the double salt $$KHSO_4 \cdot KNO_3,$$

and above the temperature at which the solution will on reaching equilibrium deposit crystals of said double salt thereby retaining substantially all the sulphate ions in a dissolved state.

2. The method of producing potassium nitrate from potassium sulphate and nitric acid comprising acting with nitric acid on potassium sulphate and cooling the solution thus obtained, for the crystallization of pure potassium nitrate, down to but not below the temperature at which the mother liquor becomes almost saturated with the double salt $KHSO_4 \cdot KNO_3$, and above the temperature at which the solution will on reaching equilibrium deposit crystals of said double salt thereby retaining substantially all the sulphate ions in a dissolved state.

3. The method of producing potassium nitrate from potassium sulphate and nitric acid comprising acting with nitric acid on a salt mixture containing potassium sulphate and another soluble sulphate and cooling the solution thus obtained, for the crystallization of pure potassium nitrate, down to but not below the temperature at which the mother liquor becomes almost saturated with the double salt $KHSO_4 \cdot KNO_3$, and above the temperature at which the solution will on reaching equilibrium deposit crystals of said double salt thereby retaining substantially all the sulphate ions in a dissolved state.

4. The method of producing potassium nitrate from potassium sulphate and nitric acid comprising acting with nitric acid on a mixture containing potassium sulphate and sodium sulphate and cooling the solution thus obtained, for the crystallization of pure potassium nitrate, down to but not below the temperature at which the mother liquor becomes almost saturated with the double salt $KHSO_4 \cdot KNO_3$ and above the temperature at which the solution will on reaching equilibrium deposit crystals of said double salt, thereby retaining substantially all the sulphate ions in a dissolved state.

5. The method of producing potassium nitrate from potassium sulphate and nitric acid comprising acting with nitric acid on a mixture of potassium sulphate and magnesium sulphate and cooling the solution thus obtained, for the crystallization of pure potassium nitrate, down to but not below the temperature at which the mother liquor becomes almost saturated with the double salt $KHSO_4 \cdot KNO_3$ and above the temperature at which the solution will on reaching equilibrium deposit crystals of said double salt, thereby retaining substantially all the sulphate ions in a dissolved state.

6. The method of producing potassium nitrate from potassium sulphate and nitric acid comprising acting with nitric acid on a double salt of potassium sulphate and another soluble sulphate and cooling the solution thus obtained, for the crystallization of pure potassium nitrate, down to but not below the temperature at which the mother liquor becomes almost saturated with the double salt $KHSO_4 \cdot KNO_3$ and above the temperature at which the solution will on reaching equilibrium deposit crystals of said double salt, thereby retaining substantially all the sulphate ions in a dissolved state.

7. The method of producing potassium nitrate from potassium sulphate and nitric acid comprising acting with nitric acid on the potassium sulphate, cooling the solution thus obtained, for the crystallization of pure potassium nitrate, down to but not below the temperature at which the mother liquor becomes almost saturated with the double salt $KHSO_4 \cdot KNO_3$ and above the temperature at which the solution will on reaching equilibrium deposit crystals of said double salt, thereby retaining substantially all the sulphate ions in a dissolved state, separating the crystals from the mother liquor and treating the latter for the production of other fertilizers.

8. The method of producing potassium nitrate from potassium sulphate and nitric acid comprising acting with nitric acid on the potassium sulphate, cooling the solution thus obtained, for the crystallization of pure potassium nitrate, down to but not below the temperature at which the mother liquor becomes almost saturated with the double salt $KHSO_4.KNO_3$ and above the temperature at which the solution will on reaching equilibrium deposit crystals of said double salt, thereby retaining substantially all the sulphate ions in a dissolved state, separating the crystals from the mother liquor and acting with that mother liquor on a phosphatic mineral to produce a mixed fertilizer.

OSCAR KASELITZ.